Aug. 29, 1961  G. H. KUNSTADT  2,998,542
OFF-CENTERED SWEEP AMPLIFIERS
Filed Feb. 24, 1955  2 Sheets-Sheet 1

INVENTOR
GEORGE H. KUNSTADT
BY Elmer J. Gorn
ATTORNEY

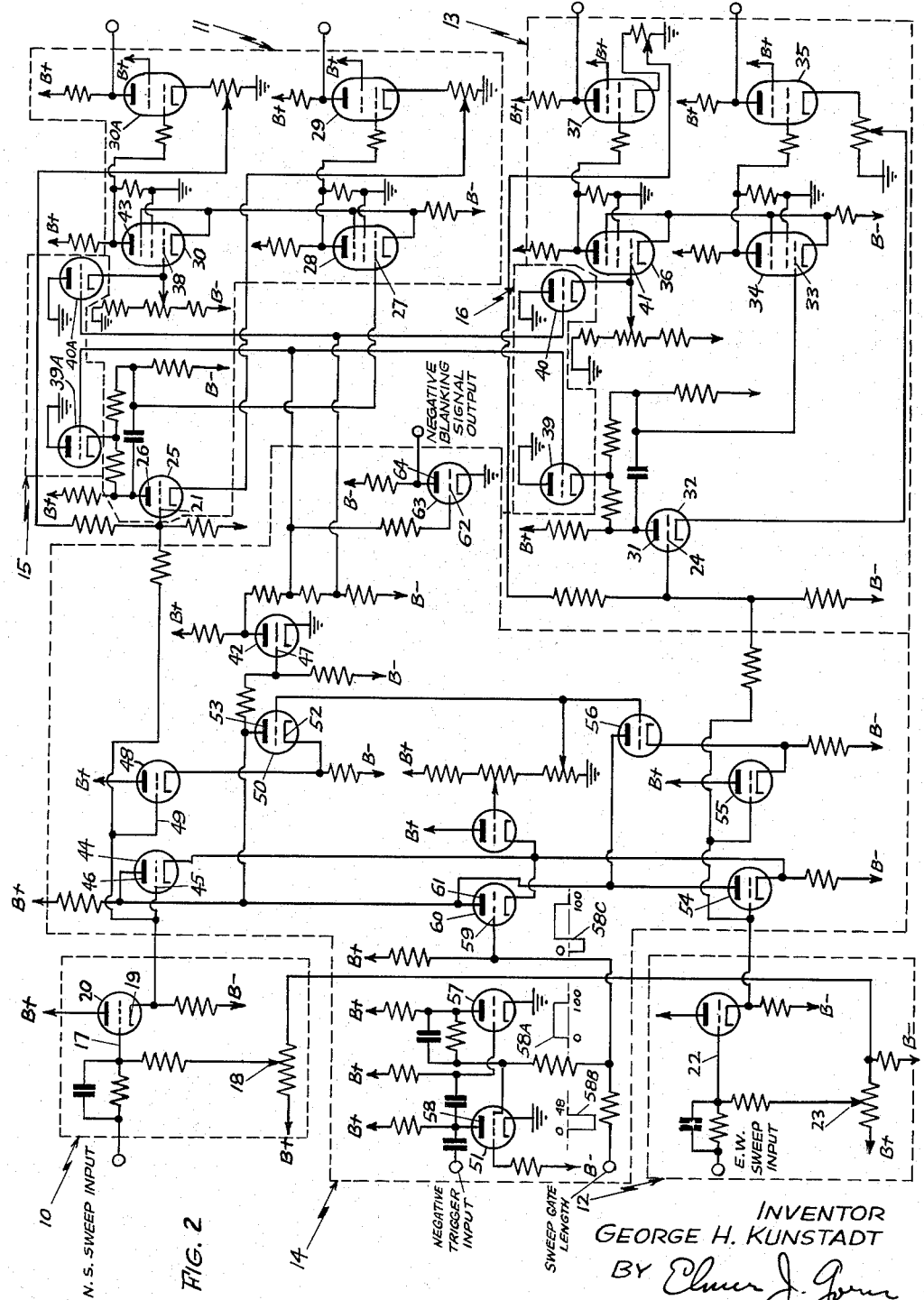

United States Patent Office 2,998,542
Patented Aug. 29, 1961

2,998,542
OFF-CENTERED SWEEP AMPLIFIERS
George H. Kunstadt, Haddonfield, N.J., assignor to Raytheon Company, a corporation of Delaware
Filed Feb. 24, 1955, Ser. No. 490,519
4 Claims. (Cl. 315—22)

This invention relates to a sweep amplifier and, in particular, to a sweep amplifier for an off-centered plan position indicator system, henceforth to be called PPI system. In copending application, filed December 14, 1954, Serial No. 475,218, now U.S. Patent No. 2,892,961, entitled "Sweep Amplifier," there is disclosed a class B feedback amplifier designed to drive the deflection coil in a fixed coil PPI system. This invention discloses how the average power dissipated in a fixed coil PPI system can be reduced for an off-centered PPI system by utilizing the basic principles enumerated in the aforementioned application.

The design of modern radar indicators has called for the use of off-centering controls in order to expand a specified portion of the total sweep. This procedure is necessary in order to separate and distinguish targets that are bunched together. Heretofore, sweep circuits for conventional PPI indicators had to be designed to carry a sufficiently large current in order to drive the beam beyond the edge of the PPI tube until such a time as determined by the range of the off-centering controls. The beam would cross the face of the PPI tube for that small portion of the total sweep which is being expanded and then pass to the other side of the PPI tube for the balance of the sweep. It can be seen therefore that the sweep power output tubes had to have great current-handling capacity, in order to maintain the beam beyond the edge of the tube for the period of the sweep before and after that portion of the sweep that is expanded. Such power amplifiers, in order to supply the high output currents needed, employed many output stages.

Pursuant to the present invention, in order to remove the high output currents needed in off-centered sweep amplifier systems, means responsive to a predetermined value of sweep voltage is used to bias the sweep power output amplifiers to cut-off during that portion of the off-centered sweep that is beyond the physical limits of the indicator tube. This action results in the electron beam being allowed to return to a central position in said indicator tube. A further refinement of the invention simultaneously removes the intensification of the beam when the final power output stages are cut off, thereby removing the possibility of burning the indicator tube.

The savings in power that results from using the aforementioned system can best be understood by assuming a representative system having the following parameters:

Repetition rate, 686 cycles per second;
Sweep speed, 16 miles per radius;
Off-centering two radii due north;
Antenna direction, due south;
Total deflection current 200 milliamps; and
Plate voltage 400 volts.

In conventional circuits a current of sufficient magnitude is passed through the north half of a push-pull deflection coil in order to push the electron beam beyond the north edge of the PPI tube. At a time corresponding to 16 miles after the trigger, which represents two radii off-center, the spot would begin to move onto the screen and towards the center of the tube. The spot would pass the center of the PPI tube at a time representing 32 miles and subsequently finished beyond the south edge of the PPI tube at a time representing 48 miles. Some time later, the electron beam would re-cross the PPI scope and assume its initial position. The total power needed in both the north and south deflection coils for the aforementioned condition will be the average total current times the plate voltage, which we have assumed in our case to be:

Power=200 milliamps×400 volts=80 watts

It will be seen, therefore, that each sweep power output tube must have an allowable plate dissipation of at least 80 watts.

The basic principle behind the present invention is based on the following reasoning that the electron beam is invisible for:

$$\frac{120-32}{120}$$

or 73% of the time. Heretofore full deflection current would flow during this time in order to keep the spot beyond the edge of the PPI tube. In the circuit constructed in accordance with this invention, no current flows during this 73% down time, resulting in the beam staying in the center of the tube. The average total current is therefore:

$$200\left(\frac{1}{2}\times\frac{16}{120}+\frac{1}{2}\times\frac{16}{120}\right)=26.7 \text{ ma.}$$

and the average current in one tube is:

$$200\times\frac{1}{2}\times\frac{16}{120}=13.3 \text{ ma.}$$

By using the aforementioned parameters, the total dissipation will be only 10.7 watts, or only 5.3 watts for one output tube. It can be seen, therefore, that an 87% power saving and a 94% reduction in tube size are theoretically possible.

Further objects and advantages of this invention will be apparent as the description progresses, reference being made to the accompanying drawings wherein:

FIG. 2 is a schematic diagram of the embodiment illustrated in FIG. 1.

Figure 1:
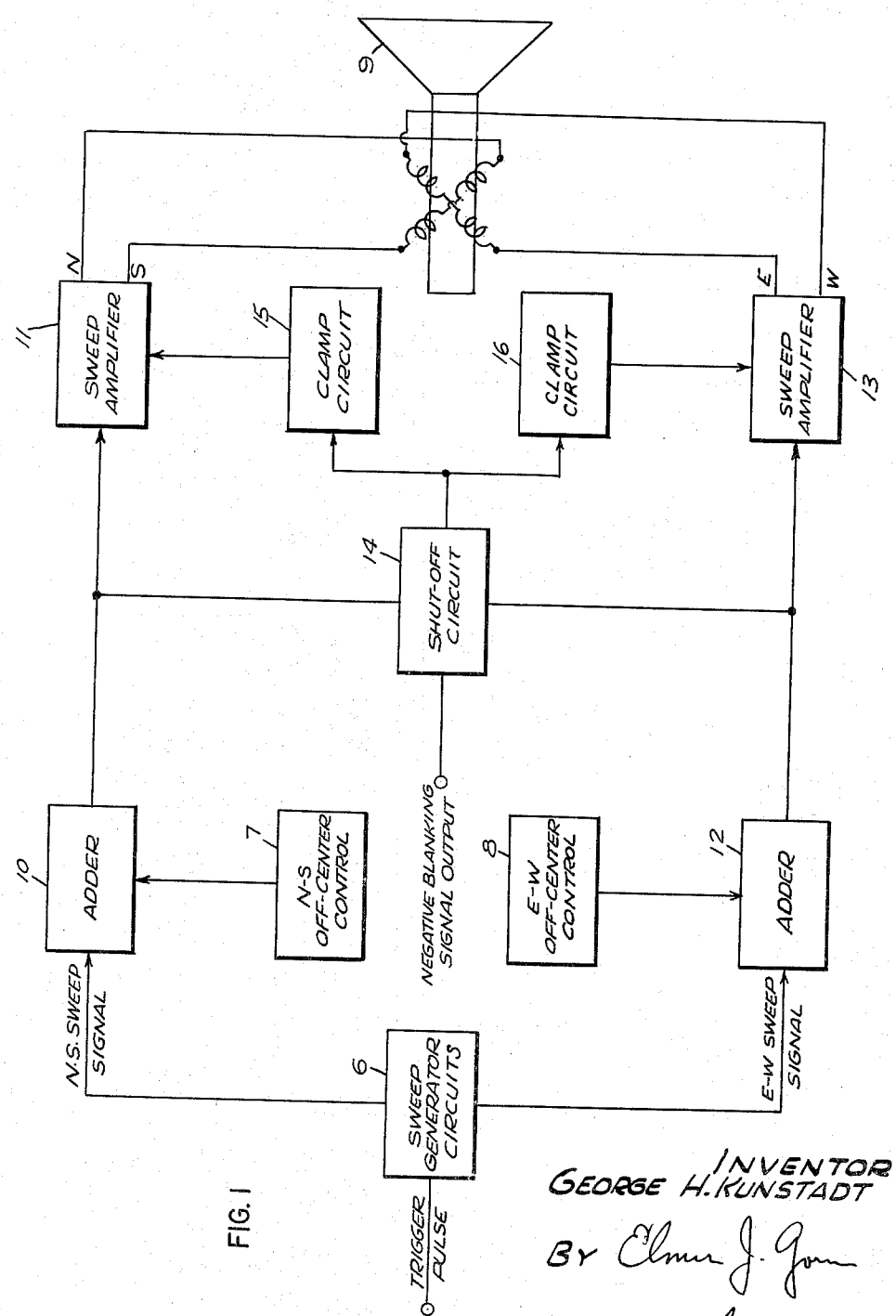
FIG. 1 is a block diagram of an embodiment of this invention.

Referring now to FIG. 1, there is shown, in block schematic form, a source of N—S and E—W sweep signals comprising PPI sweep generator circuits 6 which are caused to be actuated by a trigger pulse in any suitable manner. The PPI sweep generator circuits are of the type which cause a rotating radial sweep. Such sweep circuits are now well known in the electronics art and suitable examples of such circuits may be found in Radar Electronic Fundamentals, June 1944, published by the U.S. Government Printing Office. An adder 10, which is capable of accepting the north-south sweep voltage signal from sweep generator circuits 6 and adding to it a D.C. off-center voltage that is determined by a front panel off-center control 7. Adder 10 is connected to and drives sweep amplifier 11 which in turn drives the north and south deflection coils of cathode ray tube 9. In a similar manner, adder 12 is connected to sweep generator circuits 6 and an E—W off-center control 8 and the adder drives sweep amplifier 13 which in turn energizes the east and west deflection coils of cathode ray tube 9. A voltage-sensitive shut-off circuit 14 is connected to the outputs of adders 10 and 12 and is critically responsive to the voltages produced therein. Shut-off circuit 14, in turn, controls clamp circuit 15 and clamp circuit 16 which, in turn, are respectively connected to sweep amplifier 11 and sweep amplifier 13. The operation of the circuit is such that whenever the input voltage signal to either sweep amplifier 11 or sweep amplifier 13 is of such a value that it will place the sweep beyond the edge of the PPI tube, shut-off circuit 14 will operate clamp circuit 15 and clamp circuit 16 thereby biasing both sweep amplifiers 11 and 13 to cut-off. Simultaneously, a negative blanking signal is available from shut-off circuit 14 for removing the beam intensification. It can be seen, therefore, that this circuit will assure a minimum average current flow under any combination of sweep speed and off-centering conditions.

Referring now to FIG. 2, there is shown a schematic diagram illustrating the embodiment of this invention shown in FIG. 1. The schematic diagram shown in FIG. 2 illustrates two methods of removing the deflection currents from the north-south and east-west coils when the sweep is beyond physical limit of the PPI tube. By assuming an additional parameter that the total sweep will be only forty-eight miles long, it will be shown that the deflection currents can be removed on a time basis as well as a voltage basis. Under normal conditions the north-south sweep signal is fed to grid 17 of adder 10. In order to have the sweep presentation on the PPI tube in its proper vector relationship as determined by the off-centering control, a D.C. voltage from potentiometer 18, which is proportional to the off-centering desired, is also fed to grid 17 where it is algebraically added to the north-south sweep signal. The output of adder 10 is taken from cathode 19 of tube 20 which, in turn, is D.C. coupled to grid 21 of the first amplifier stage in sweep amplifier 11. In a similar manner the east-west sweep signal is applied to grid 22 of adder 12 where it is algebraically combined with a D.C. voltage, as determined by the east-west off-centering control potentiometer 23. The output of adder 12 is D.C. coupled to grid 24 of the first amplifier stage of sweep amplifier 13.

Sweep amplifiers 11 and 13 are identical to each other and similar to the D.C. coupled class B sweep amplifier described in the aforementioned copending application. Under normal conditions, the north-south sweep signal on grid 21 of amplifier tube 25 will be fed from plate 26 to grid 27 of amplifier tube 28. The output signals from tube 28 drive the north sweep power amplifier tube 29 and, also, a grounded grid amplifier tube 30 which, in turn, drives the south sweep power amplifier tube 30A. In a similar manner, the east-west sweep signal that is fed to grid 24 is fed from plate 31 of amplifier tube 32 to grid 33 of amplifier tube 34. The output signals from tube 34 feed the east sweep power amplifier tube 35 and a grounded grid amplifier tube 36, which, in turn, drives a west sweep power amplifier tube 37.

It will be observed that clamp circuit 15 is comprised of tubes 39A and 40A which are effectively connected to grid 27 of tube 28 and grid 38 of tube 30. In a similar manner, clamp circuit 16 is comprised of tubes 39 and 40 which are effectively connected to grid 33 of tube 34 and grid 41 of tube 36. The grids of tubes 39A and 39 are connected to and held beyond cutoff by the output of normally conducting tube 42. In a similar manner the grids of tubes 40A and 40 are connected to, and held beyond cut-off by the output of tube 42. It can be seen, therefore, that under normal conditions both the north-south sweep signal and east-west sweep signal will proceed to the north-south and east-west deflection coils, as long as tube 42 of shut-off circuit 14 is conducting.

It will be observed that shut-off circuit 14 is concerned primarily with the operation of tube 42. If tube 42 stops conducting, clamp tubes 39A and 40A of clamp circuit 15 and clamp tubes 39 and 40 of clamp circuit 16 are all conducting, thereby ensuring a large positive signal to grids 38, 27, 41 and 33. This action will cause tubes 30, 28, 36 and 34 to conduct heavily. Referring now to tube 30, it can be seen that if tube 30 conducts heavily, the voltage on plate 43 will decrease which, in turn, will cause the south power output tube 30A to cut off and stop conducting. In a similar manner, tubes 29, 37 and 35 in the north, west and east sweep circuits will also stop conducting due to their being cut off. It can be seen, therefore, that the control of sweep amplifier 11 and sweep amplifier 13 is determined by the conduction and nonconduction of tube 42 of shut-off circuit 14.

If under conditions of off-centered sweep the north-south input voltage should become high enough to drive the beam beyond the face of the PPI tube due north, tube 44, which is normally nonconducting, will conduct, since its grid 45 is connected to cathode 19 which is the output of tube 20. The conduction of tube 44 will cause the plate voltage on plate 46 to decrease, which, in turn, will cause grid 47, which is D.C. coupled to plate 46, to be driven beyond cut-off. Cutting off tube 42 will initiate clamp circuits 15 and 16 cutting off sweep amplifiers 11 and 13, as previously described.

If the north-south sweep voltage should become too low, which will cause the sweep signal to disappear in an opposite southerly direction, tube 48, which is normally conducting, will stop conducting since its grid 49 is also D.C. coupled to cathode 19 of tube 20. When tube 48 stops conducting, cathode 52 is allowed to go negative, thereby allowing tube 50 to conduct. This action causes the voltage on plate 53, which is D.C. coupled to grid 47, to decrease beyond cut-off. This action will cause tube 42 to stop conducting and bias sweep amplifiers 11 and 13 beyond cut-off, as previously explained. In a similar manner, the east-west sweep signal is protected against high and low voltages that would cause the signal presentation to fall beyond the PPI scope in the east and west directions by the operation of tubes 54, 55 and 56, which operate in a similar manner as tubes 44, 48 and 50.

By assuming a total sweep of only forth-eight miles, it will now be shown how it is possible to bias both sweep amplifiers 11 and 13 to cut-off on a time basis as well as a voltage basis as previously described. Multivibrator tubes 51 and 57 are designed to produce a square pulse starting at zero time and ending at a time representing one hundred miles. An initial negative trigger pulse at zero time is fed to plate 58 of tube 51 in order to initiate the multivibrator action. The output square pulse 58A of zero to one hundred miles is produced by the multivibrator action of tubes 51 and 57 and is impressed on grid 59 of tube 60. A negative gate pulse 58B, depending on the sweep gate length desired, which under the given conditions could fall from zero to forty-eight miles, is also fed to grid 59. Under maximum conditions of sweep presentation, which would be from zero to forty-eight miles, the negative gate 58B will be fed to grid 59 starting at zero and ending at a time equal to forty-eight miles. This negative gate will combine algebraically with the positive gate 58A of zero to one hundred miles produced by multivibrator tubes 51 and 57. The resulting voltage 58C appearing on grid 59 will therefore be a negative voltage from zero to forty-eight miles and a positive gate voltage from forty-eight to one hundred miles. Since tube 60 is normally nonconducting, nothing will happen for the period of time from zero to forty-eight miles, but at forty-eight miles the positive voltage on grid 59 will cause tube 60 to conduct, thereby causing a negative voltage to appear on plate 61 of tube 60, the output of which is D.C. coupled to grid 47 of tube 42. The result, therefore, is that from time forty-eight miles to time one hundred miles tube 42 will be cut off in the same manner as previously described.

It can be seen, therefore, that sweep amplifier 11 and sweep amplifier 13 will be cut off on a time basis, since under the conditions given it was stated that only a forty-eight-mile sweep length could be observed and that anything over forty-eight miles would only drive the electron beam beyond the edge of the PPI tube.

Grid 62 of tube 63 is also connected to the output of tube 42, and it can be seen, therefore, that whenever tube 42 stops conducting, normally cut-off tube 63 will conduct, allowing the plate voltage on plate 64 of tube 63 to drop. This voltage from plate 64 is used as an intensification signal for shutting off the PPI beam whenever tube 42 stops conducting.

This completes the description of the embodiments of the invention illustrated herein. However, many modifications and advantages thereof will be apparent to persons skilled in the art without departing from the spirit and scope of this invention. For example, any means, whether it be on a time basis or a voltage basis, that is capable of setting up a predetermined voltage limit for any of the east, west, north or south directions can be used. Since the basic premise of this invention is to turn off the power output stages whenever the beam is beyond the physical limits of the indicating scope, it is desired that this invention not be limited to internal circuitry or to the particular details of the embodiments disclosed herein. For example, external methods, such as photoelectric cells, or other photo-measuring devices that are known to men skilled in the art can be used to determine when the viewing beam is beyond the physical limits of the indicating tube. Accordingly, it is desired that this invention not be limited to the particular details of the embodiments disclosed herein, except as defined by the appended claims.

What is claimed is:

1. A display system comprising a cathode ray tube having a display surface, means for generating an electron beam in said tube and directing said beam towards the center of said display surface, means for producing fields within said tube for deflecting said beam, means for generating a voltage suitable for energizing said field producing means to displace said beam from the center of said display surface, means for generating a deflection voltage suitable for energizing said field producing means to deflect said beam to sweep a raster across said display surface, means for combining said beam displacing voltage and said beam deflection voltage to produce a combined voltage, an amplifier connected to said field producing means for energizing said field producing means in response to said combined voltage, and disabling means connected to said amplifier and responsive to the magnitude of said combined voltage for deenergizing said amplifier when said beam is deflected beyond said display surface.

2. A display system comprising a cathode ray tube having a display area, means for generating an electron beam in said tube and directing said beam towards the center of said display area, means for producing fields within said tube for deflecting said beam, means for generating a voltage suitable for energizing said field producing means to displace said beam from the center of said display area, means for generating a deflection voltage suitable for energizing said field producing means to deflect said beam to sweep a raster across said display area, adding means for combining said beam displacing voltage and said beam deflection voltage, an amplifier connected to said field producing means for energizing said field producing means in response to said combined voltage, and disabling means connected to said amplifier, said disabling means including devices establishing lower and upper voltage limits, said disabling means being responsive to the magnitude of said combined voltage for deenergizing said amplifier when said combined voltage departs from the range between said limits.

3. A display system comprising a cathode ray tube having a display area, means for generating an electron beam in said tube and directing said beam towards the center of said display area, means for producing fields within said tube for deflecting said beam, means for generating a voltage suitable for energizing said field producing means to displace said beam from the center of said display area, means for generating a deflection voltage suitable for energizing said field producing means to deflect said beam to sweep a raster across said display area, adding means for combining said beam displacing voltage and said beam deflection voltage, an amplifier connected to said field producing means for energizing said field producing means in response to said combined voltage, disabling means connected to said amplifier, said disabling means including devices establishing lower and upper voltage limits, said disabling means being responsive to the magnitude of said combined voltage for deenergizing said amplifier when said combined voltage departs from the range between said limits, and a blanking signal generator connected to said disabling means and said cathode ray tube, said blanking signal generator being adapted to blank said electron beam when said amplifier is deenergized by said disabling means.

4. A display system comprising a cathode ray tube having a display area, means for generating an electron beam in said tube and directing said beam toward the center of said display area, means for producing fields within said tube for deflecting said beam, means for generating a voltage suitable for energizing said field producing means to displace said beam from the center of said display area, means for generating a beam deflection voltage, an adder for combining said beam displacing voltage and said beam deflection voltage to produce a combined voltage, an amplifier connected to said field producing means for energizing said field producing means in response to said combined voltage, a cut-off tube coupled to said amplifier, and means connected between said cut-off tube and said adder for sensing when said combined voltage is less than a first predetermined magnitude or exceeds a second predetermined magnitude, said sensing means being adapted to cause said cut-off tube to deenergize said amplifier when said combined voltage departs from the range between said first and second predetermined magnitudes.

References Cited in the file of this patent

UNITED STATES PATENTS

| 2,444,193 | Gillette et al. | June 29, 1948 |
| 2,610,319 | Page | Sept. 9, 1952 |
| 2,640,984 | Sherwin | June 2, 1953 |

OTHER REFERENCES

Cathode Ray Tube Displays, Radiation Laboratory Series No. 22, by Theodore Soller et al., published by McGraw-Hill Book Company, Inc., New York, 1948. Pages 484 through 486.